United States Patent
Eide et al.

(10) Patent No.: US 11,194,823 B2
(45) Date of Patent: *Dec. 7, 2021

(54) SYSTEMS AND METHODS FOR ANONYMIZED STATISTICAL DATABASE QUERIES USING NOISE ELEMENTS

(71) Applicants: Sebastian Probst Eide, Berlin (DE); Paul Francis, Kaiserslautern (DE); Cristian Daniel Berneanu, Bucharest (RO); Sasa Juric, Zagreb (HR); Pawel Obrok, Cracow (PL)

(72) Inventors: Sebastian Probst Eide, Berlin (DE); Paul Francis, Kaiserslautern (DE); Cristian Daniel Berneanu, Bucharest (RO); Sasa Juric, Zagreb (HR); Pawel Obrok, Cracow (PL)

(73) Assignees: AIRCLOAK GMBH, Kaiserslautern (DE); MAX PLANCK GESELLSCHAFT ZUR FÖRDERUNG DER WISSENSCHAFTEN E.V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/783,306

(22) Filed: Oct. 13, 2017

(65) Prior Publication Data
US 2018/0052894 A1 Feb. 22, 2018

Related U.S. Application Data

(63) Continuation-in-part of application No. 15/366,449, filed on Dec. 1, 2016.
(Continued)

(30) Foreign Application Priority Data

May 10, 2016 (EP) .................................... 16169000
Dec. 2, 2016 (EP) .................................... 16202010
May 10, 2017 (EP) .................................... 17170505

(51) Int. Cl.
*G06F 16/00* (2019.01)
*G06F 16/2458* (2019.01)
(Continued)

(52) U.S. Cl.
CPC .......... *G06F 16/2462* (2019.01); *G06F 7/582* (2013.01); *G06F 16/221* (2019.01);
(Continued)

(58) Field of Classification Search
CPC ............... G06F 17/30979; G06F 7/582; G06F 21/6227; G06F 21/6254; G06F 17/30864;
(Continued)

(56) References Cited

U.S. PATENT DOCUMENTS

2003/0097579 A1 5/2003 England et al.
2004/0068488 A1* 4/2004 Dettinger ............ G06F 16/2425
(Continued)

FOREIGN PATENT DOCUMENTS

EP 2416271 A2 8/2012
EP 2930646 A2 10/2015
(Continued)

OTHER PUBLICATIONS

Ruichuan Chen, Istemi Ekin Akkus, Paul Francis, "SplitX: High-Performance Private Analytics," ACM SIGCOMM 2013, Aug. 2013, Hong Kong (Year: 2013).*
(Continued)

*Primary Examiner* — Dinku W Gebresenbet
*Assistant Examiner* — Suman Rajaputra
(74) *Attorney, Agent, or Firm* — Grogan, Tuccillo & Vanderleeden, LLP

(57) ABSTRACT

An anonymizing method for a database system is provided. The method includes receiving a query, identifying one or
(Continued)

more attack components in the query, computing one or more noise elements from the one or more attack components, and computing fixed noise or fixed thresholds from the one or more noise elements.

16 Claims, 8 Drawing Sheets

Related U.S. Application Data

(60) Provisional application No. 62/333,910, filed on May 10, 2016.

(51) Int. Cl.
*H04L 9/06* (2006.01)
*G06F 16/22* (2019.01)
*G06F 16/2457* (2019.01)
*G06F 21/62* (2013.01)
*G06F 7/58* (2006.01)

(52) U.S. Cl.
CPC ...... *G06F 16/2457* (2019.01); *G06F 21/6227* (2013.01); *G06F 21/6254* (2013.01); *H04L 9/0662* (2013.01)

(58) Field of Classification Search
CPC ......... G06F 17/30867; G06F 17/30286; G06F 17/30595; G06F 16/2462; G06F 16/221; G06F 16/2457; G06Q 30/02; G06C 30/02; H04L 9/0662
See application file for complete search history.

(56) References Cited

U.S. PATENT DOCUMENTS

| | | |
|---|---|---|
| 2004/0139334 A1 | 7/2004 | Wiseman |
| 2007/0143289 A1 | 6/2007 | Dwork et al. |
| 2007/0179904 A1 | 8/2007 | Hofstee et al. |
| 2009/0327296 A1 | 12/2009 | Francis et al. |
| 2010/0082960 A1 | 4/2010 | Grobman et al. |
| 2011/0277037 A1* | 11/2011 | Burke .................... G06F 21/60 726/26 |
| 2012/0036135 A1* | 2/2012 | Fu .................... G06F 16/24578 707/748 |
| 2012/0143922 A1 | 6/2012 | Rane et al. |
| 2012/0150841 A1 | 6/2012 | Ramamurthy et al. |
| 2014/0143239 A1* | 5/2014 | Fu ...................... G06F 21/6254 707/723 |
| 2015/0007249 A1* | 1/2015 | Bezzi .................. G06F 21/6227 726/1 |
| 2016/0335455 A1* | 11/2016 | Mohan ................ G06F 21/6254 |
| 2017/0004110 A1* | 1/2017 | Bhattacharjee ... G06F 15/17331 |
| 2020/0327252 A1* | 10/2020 | Mcfall .................. G06F 21/602 |

FOREIGN PATENT DOCUMENTS

| | | | |
|---|---|---|---|
| JP | 2000029830 | A | 1/2000 |
| JP | 2003099403 | A | 4/2003 |
| JP | 2015204111 | A | 4/2017 |
| WO | 2005098736 | A3 | 10/2003 |
| WO | 2009015116 | A1 | 1/2009 |
| WO | 2012064176 | A1 | 5/2012 |
| WO | 2014073370 | A1 | 5/2014 |
| WO | 2014143208 | | 9/2014 |

OTHER PUBLICATIONS

Ruichuan Chen, Alexey Reznichenko, Paul Francis, "Towards Statistical Queries over Distributed Private User Data," USENIX Symposium on Networked Systems Design and Implementation, NSDI 2012 (Year: 2012).*
Istemi Ekin Akkus, String Discovery for Private Analytics, Technical Report MPI-SWS-2013-006 (Year: 2013).*
Ruichuan Chen, Alexey Reznichenko, Paul Francis, "Towards Statistical Queries over Distributed Private User Data," USENIX Symposium on Networked Systems Design and Implementation, NSDI 2012. This document is provided in the previous office action (Year: 2012).*
Extended European Search Report dated Oct. 7, 2015.
"Query Audit Method for Privacy Protection in Disclosing the Result of Similarity Search" by Hiromi Arai, Technical Research Report of the Institute of Electronics Information and Communication, book, The Institute of Electronics Information and Communication, Nov. 5, 2013, 113, 286, p. 77-83.
"Bayesian Differential Privacy on Correlated Data" by Bin Yang, 8th Forum on Data Engineering and Information Management (The 14th Database Society/ Next Conference), Books, Data and Engineering Research Committee of the Institute of Electronics Information and Communication Academic Information Processing Society of Japan Database System Study Group, Mar. 2, 2016, pp. 1-8.
Korean Office Action dated Nov. 14, 2018 issued in the corresponding Korean Application No. 10-2017-0057518.

* cited by examiner

SYSTEMS AND METHODS FOR ANONYMIZED STATISTICAL DATABASE QUERIES USING NOISE ELEMENTS

CROSS REFERENCE TO RELATED APPLICATIONS

This application is a Continuation-In-Part Application of U.S. patent application Ser. No. 15/366,449, filed Dec. 1, 2016, European patent application Serial No.: 16202010.1, filed Dec. 2, 2016, both of which claim the benefit of U.S. Provisional patent application Ser. No. 62/333,910, filed May 10, 2016, and European provisional patent application Serial No.: 16/169,000, filed May 10, 2016, the recitations of all of the foregoing applications being incorporated herein by reference in their entirety. This application further claims the benefit of European patent application Serial No.: 17170505.6, filed May 10, 2017, the recitations of which are also incorporated herein by reference in their entirety.

FIELD OF THE INVENTION

The present invention relates to statistical methods for data analysis, and more specifically, to anonymization of responses produced from database queries.

BACKGROUND OF THE INVENTION

It is often desired that an analyst be able to obtain statistical data from a database containing user information without being able to learn anything about individual users in the database. Simply removing names or identification numbers from the database is not effective to prevent individual privacy loss. For instance, if an analyst knows the birthdate, gender, and zip code of an individual in the database (the victim), this alone is often enough information to uniquely identify the victim. The analyst can then form a query specifying this information plus some sensitive information the analyst wishes to learn about the victim, and obtain the answer. For instance, "what is the sum of the salaries of all male individuals born on Dec. 14, 1957, with zip code 67663?" If there is only one such person, the sum of salaries will be that person's salary.

In early prior art, a mechanism to defend against this was simply to not provide an answer unless there are at least K individuals represented in the answer. However, this defense can often be easily circumvented. For instance, the analyst may make the following two queries: 1) "what is the sum of the salaries of all males?", and 2) "what is the sum of the salaries of all males not born on Dec. 14, 1957 and not having zip code 67663?" The first query includes all males, whereas the second query includes all males except the victim. By subtracting the second sum from the first, the victim's salary can be computed.

Other prior art addresses this problem by modifying the data in the database itself. One approach is to add noise to numerical values in the database. Another approach is to swap specific fields between users. Yet another approach, called K-anonymity, is to remove the accuracy of data values so that each user in the database looks the same as K−1 other users. These approaches, and their variants, can provide strong anonymity, but often destroy the utility of the data itself. Furthermore, these approaches are complex to configure, often resulting in errors that weaken the strength of the anonymity.

Another prior art approach, "differential privacy," is a method of anonymization whereby responses to queries from a database take the form of numerical answers, and random noise is added to the numerical answers. The phrase "noisy numerical answer" refers to the number that is produced by adding random noise to a numerical answer.

To give an example of how this works, suppose the query is "How many users are there that are male, are born on Dec. 14, 1957, with zip code 67663, and have a salary between $90,000 and $100,000?" The true numerical answer would be 1 or 0, depending on whether the user (the victim of the query) has that salary or not. Suppose that random noise with a normal distribution and standard deviation of 5 is added. Now the answer might well be 6, or negative 8. The analyst would have no idea whether the victim has that salary or not, thus protecting that victim's privacy. On the other hand, suppose that the query is "How many males in zip code 67663 have a salary between $90,000 and $100,000?" If the true numerical answer is 513, the noisy numerical answer might be for instance 510 or 518. As a result, the analyst obtains a reasonably accurate answer. In this way, a differentially private system can provide both privacy and accuracy.

The problem comes when the analyst is allowed to repeat the query. Assuming the first query, each noisy numerical answer would be taken from a random distribution with an expected value of either 0 or 1. With enough such noisy answers, the analyst could take the average and have high confidence of the true answer.

The generally known solution to this problem is to limit the number of times an analyst may query a differentially private database. However, this is not practical, as repeated identical queries may be useful and important in cases for instance where the contents of a database are constantly changing, so that identical queries may produce different results at different times.

Accordingly, there is a need for an anonymizing method and system that is more efficient in terms of computation and memory, and that protects anonymity against condition/inverse condition pairs.

SUMMARY OF THE INVENTION

Aspects of the present invention provide a system having, and/or a method using, an anonymization module whose input is a query, whose output is a perturbed statistical answer, and which interacts with a data store by requesting tables consisting of rows and columns. In an embodiment, the module identifies attack components in the query that can influence the rows in the tables, and adds noise elements to mask small effects of those attack components. The module therefore defends against attacks that use the difference between queries to infer information about individual users.

In an embodiment, the module perturbs the statistical answer such that it is highly unlikely that information about individual users can be inferred from either a single answer, or from repeated instances of a single answer. This is done by adding enough noise that the effect of both average and outlying user values are hidden, and by ensuring that the output is derived from a group of users.

In an embodiment, the module uses a set of fixed-random number elements summed together for adding noise and for setting noisy thresholds. The fixed-random numbers are taken from a pseudo-random distribution in such a way that on one hand the same answer produces the same pseudo-random number element, but on the other hand different query conditions will produce a different pseudo-random number elements.

In an embodiment, the module defines time epochs, and when generating an answer, ignores changes to the database that took place after the last time epoch.

In an embodiment, the module derives noise elements from a hierarchy of time epochs.

In an embodiment, the module ignores changes to the database that occurred prior to the latest time epoch where more than a distinct number of users experienced a database change that influences the answer.

These and other objects, features and advantages of the present invention will become apparent in light of the detailed description thereof, as illustrated in the accompanying drawings.

DETAILED DESCRIPTION OF THE PREFERRED EMBODIMENT

Figure 1:
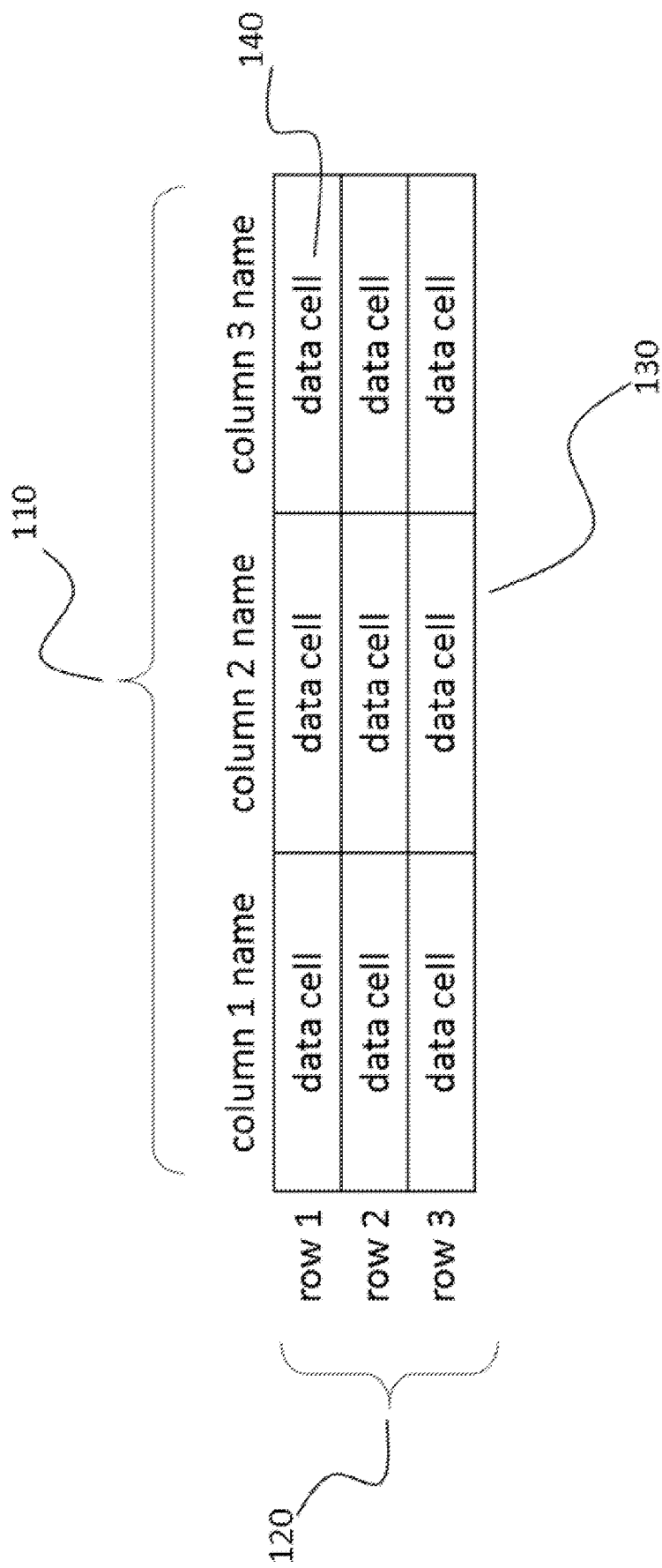
FIG. 1 shows schematically a conceptual representation of data as a table with columns and rows, in accordance with an embodiment of the present invention.

Reference will be made below in detail to exemplary embodiments of the invention, examples of which are illustrated in the accompanying drawings. Wherever possible, the same reference characters used throughout the drawings refer to the same or like parts, without duplicative description.

As used herein, the terms "substantially," "generally," and "about" indicate conditions within reasonably achievable manufacturing and assembly tolerances, relative to ideal desired conditions suitable for achieving the functional purpose of a component or assembly.

As will be appreciated, answers to a query may be made anonymous by determining which attack components, when removed or adjusted, lead to a user id ("UID") difference smaller than a fixed threshold, and then adding or removing rows relative to those matching the modified query to remove the effect of the attack components. For example, the answers to two queries that differ by a single or only a few users may be made identical. Such an approach, however, may require significant computation (processing power) and memory recourses to determine by what amount an original analyst query and the modified query differ. When a query condition such as "WHERE salary=100000" is removed from the query, then the resulting answer may contain many times more rows than the original query that contained the condition.

Additionally, an analyst may learn exact answer values using a series of query pairs whereby one query includes a condition, and the other query the inverse of that condition. Each pair when summed produces a noisy count. When the sequence of pairs is averaged, the noise may be eliminated and an exact count produced.

Accordingly, referring now to FIG. 1, an embodiment of the present invention operates on data stored in a storage medium, e.g., a database/data store. Conceptually, in embodiments, the data is a table 130 consisting of data cells 140 organized as rows 120 and columns 110. Physically, in embodiments, the data does not have to be stored as rows and columns per se, as long as semantically the data can be referenced as a table of rows and columns. In embodiments, each column may have a name, and each data cell (or just cell for short) may be numeric, a string, or any other data type.

Figure 2:
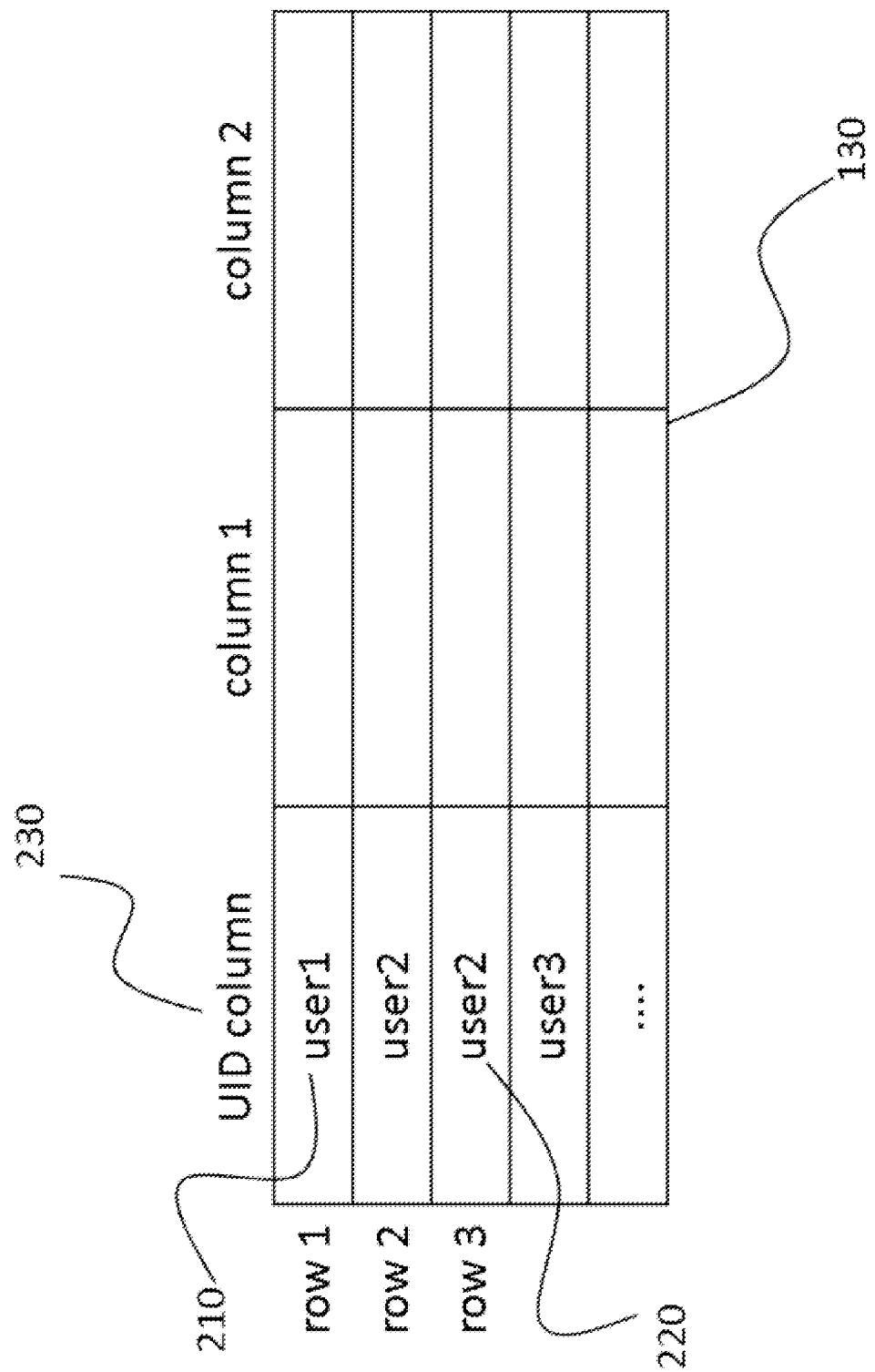
FIG. 2 shows schematically a conceptual table with a column containing UIDs, in accordance with an embodiment of the present invention.

In embodiments, the conceptual table may have a column that identifies the entity being protected by the present invention. The entity would typically be a person, but may also be, for instance, a device that a person uses, like a smart phone or a car, or any other entity whose privacy should be protected. Referring to FIG. 2, this document refers to these entities as users, to the column as the UID column 230, and to the cell values 210 and 220 as the UIDs. Each user in the table may have a unique UID 210 and 220, which may be for instance a string or a number. In embodiments, the cells for any given row contain information about the user identified by that row's UID. The same UID may appear in multiple rows, for instance user2 220 in FIG. 2.

An embodiment of the present invention is herein referred to as a "cloak," e.g., a computer having at least one processor and a memory device and is operative to execute one or more of the methods disclosed herein. The software that implements the cloak may be integrated into for instance the software that implements the data store/database. Alternatively, the software that implements the cloak may stand alone, and interact with the data store through a well-defined standard interface. In this latter case, the hardware that runs the cloak software may be the same as that which runs the data store software, or may be a distinct machine.

A query to a data store/database for statistical analysis may be characterized as consisting of two steps. Step 1 selects from among all rows and columns a subset of rows and columns. Step 2 computes a statistical operation over the cells from one or more columns of the selected rows. Typical statistical operations include count (count the number of rows), count distinct (count the number of distinct cell values), avg (compute the average of cell values), std-dev (compute the standard deviation of cell values), sum, max (select the maximum cell value), min, median, and others.

In embodiments, the first step conceptually operates on a row-by-row basis. For each row, in such embodiments, comparison operations on cells from specified columns are performed to produce as output a Boolean TRUE or FALSE per operation. Boolean logic may then be applied to the outputs to determine if the row should be selected (TRUE) or not (FALSE). These kinds of comparison operators and Boolean logic may be found for example in the WHERE and HAVING clauses of SQL (among other clauses). As a convention, examples using the SQL WHERE clause herein should be understood to be exemplary of this row-selection process for any query language, and not limited to SQL.

An example of this is: [WHERE (age>20) AND (gender='male')]. Here, age and gender are the column names. The first comparison operation is 'greater than' performed on a numeric type, and the second is 'equal to' performed on a string. The two Booleans produced by the two comparisons are then subjected to a Boolean 'AND' operation. If the result is TRUE, then the row is selected. Otherwise the row is not selected. Typical comparison operators include =, <, >, ≤, ≥, and ≠. Typical Boolean operators include AND, OR, and NOT.

In embodiments, the cloak anonymizes by applying some perturbation to statistical operations that execute over the data. This is called answer perturbation.

As will be appreciated, certain operations in answer perturbation require a pseudo-random number. Randomness is generally required to prevent an analyst from establishing concrete facts about the data with high confidence. This pseudo-random number may come from some distribution and its associated parameters, for instance a Gaussian distribution with parameters mean and standard distribution.

Anonymization in embodiments of the cloak uses a special kind of pseudo-random number generation called fixed-random. A fixed-random number is a pseudo-random number whose value may be controlled by the cloak. This control allows the cloak to ensure that the same query generates the same noise, or that two different queries that nevertheless return the same answer have different noise.

In an embodiment, the cloak controls the value of a fixed-random number by controlling the value used to seed a Pseudo-Random Number Generator (PRNG). If the cloak uses the same seed, the PRNG generates the same fixed-random number. If the cloak uses a different seed, the PRNG generates a different fixed-random number with high probability. In an embodiment, the cloak uses information derived from the rows returned by the database, in full or in part, to control the fixed-random number. In an embodiment, the cloak uses information derived from the query itself, in full or in part, to control the fixed-random number.

In embodiments, there may be two common usages of a fixed-random number in the cloak. One is fixed noise, and the other is the fixed threshold.

Fixed noise refers to the mechanism of adding noise to numerical answers so as to obscure the exact answer. In one embodiment, fixed noise is a fixed-random number with a mean of zero. By using a zero mean, the expected value of the answer is equal to the true answer, which is an important statistical property. Non-Gaussian distributions may also be used. Other means could also in principle be used.

A fixed threshold may be used in the cloak when a decision needs to be made based on some threshold value. For instance, if the cloak requires roughly K distinct users to contribute to an answer, then K would be a fixed threshold (i.e. based on a fixed-random value) rather than always exactly K. In one embodiment, the fixed threshold is a fixed-random number with a mean of K. Assuming the fixed-random number is taken from a Gaussian distribution, the standard deviation is chosen such that a value of zero or less is highly improbable. For instance, the standard deviation may be selected as K/4 or smaller. In one embodiment, a hard lower bound is placed on the fixed threshold. For instance, the fixed threshold may never be less than one (1) even in the case where the fixed-random number is less than one (1).

As will be appreciated, the primary way that an analyst can control what is learned from the database is through comparison operations and associated boolean logic. In particular, an analyst may try to infer information about a user in the database by comparing the answers to two different queries whose answers are either the same, or differ by only a single user.

For instance, suppose that an analyst creates two queries, one with the comparison operations and boolean logic [(disease='AIDS') AND (job title≠'CEO')], and one with [(disease='AIDS')]. If the CEO has AIDS, then he or she is excluded from the first query, and included in the second. If the CEO does not have AIDS, then he or she is excluded from both queries. The analyst may try to exploit this to determine if the analyst has AIDS.

In another example, the analyst may know that the CEO has a salary of $1000000, and that this is the highest salary in the database. In this case, the analyst could create two queries with the following comparisons and logic: [(disease='AIDS') AND (salary<1000000)] and [(disease='AIDS') AND (salary<100001)]. The CEO is excluded from the first query, and included in the second only if he or she has AIDS.

These kinds of attacks are called difference attacks, because the analyst looks for a difference in the answers of two queries to infer something about users. Because the analyst may try to use comparison operations and boolean logic to execute a difference, we refer to the comparison operations and associated logic as attack components.

To defend against difference attacks, the cloak may ensure that two queries with different attack components have different noise, even when the answers to the two queries are the same. As a result, the fact that two answers are different does not disclose the presence or absence of a user in an answer.

As will be appreciated, an analyst may try to prevent the cloak from detecting an attack component by encoding it in an obscure way, for instance by implementing Boolean logic with math syntax. In an embodiment, the cloak examines queries for such possible encodings, and rejects queries with said encodings.

In an embodiment, fixed noise and fixed thresholds may be based on multiple fixed random values. If the fixed noise and fixed threshold use a Gaussian distribution, then the multiple fixed random values are summed to produce the fixed noise or fixed threshold. The individual noise values that includes fixed noise or the fixed threshold are called "noise elements". As will be appreciated, distributions other than Gaussian may be used for noise elements, and operations other than summing may be used to combine the noise elements.

Noise elements are fixed in that the same noise value is produced for the same attack component. As a result, if the same query is repeated, the noise will be the same, and so the noise value cannot be averaged away, as would be the case if, for instance, the noise value was a pure pseudo-random value. In one embodiment, the noise element is taken from a zero-mean Gaussian distribution.

Two attack components are considered the same if they have the same semantics. So for instance, the attack components [salary=100000] and [salary=2*50000] are considered the same, and the corresponding noise elements would be derived from the same seed.

Figure 3:
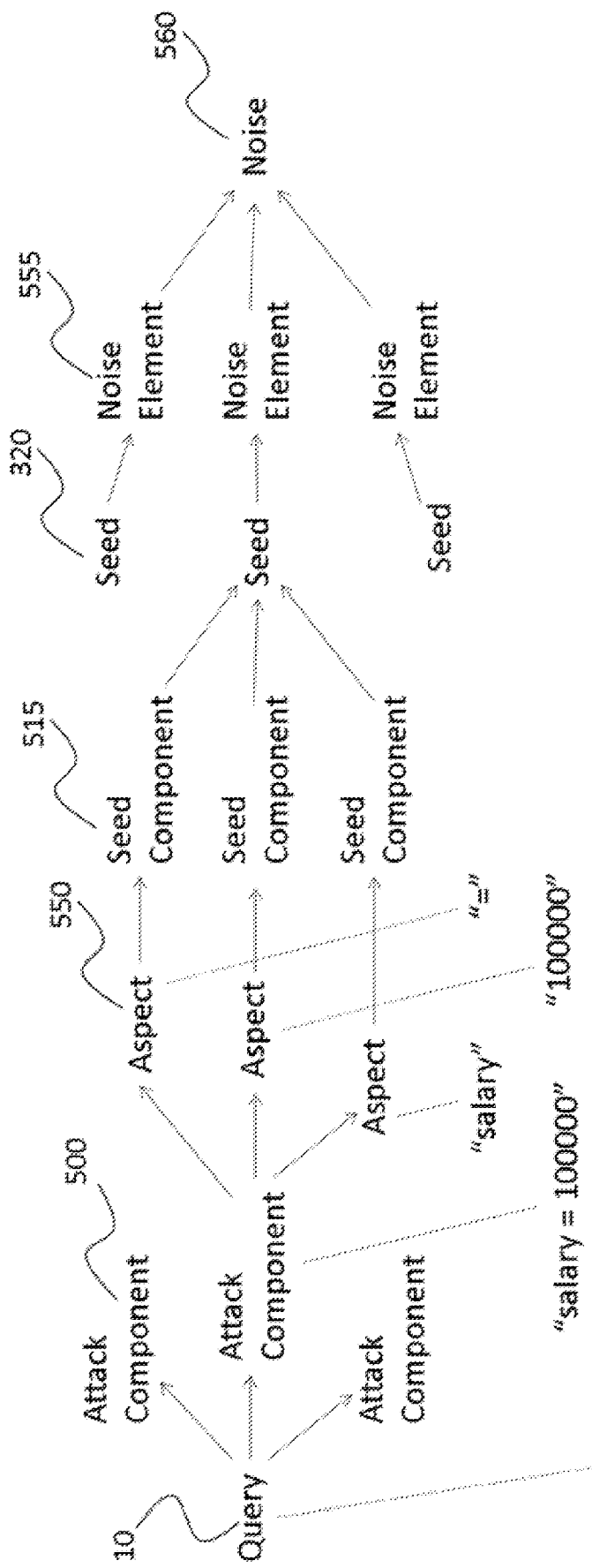
FIG. 3 shows schematically the components used to generate noise elements, in accordance with an embodiment of the present invention.
Figure 4:
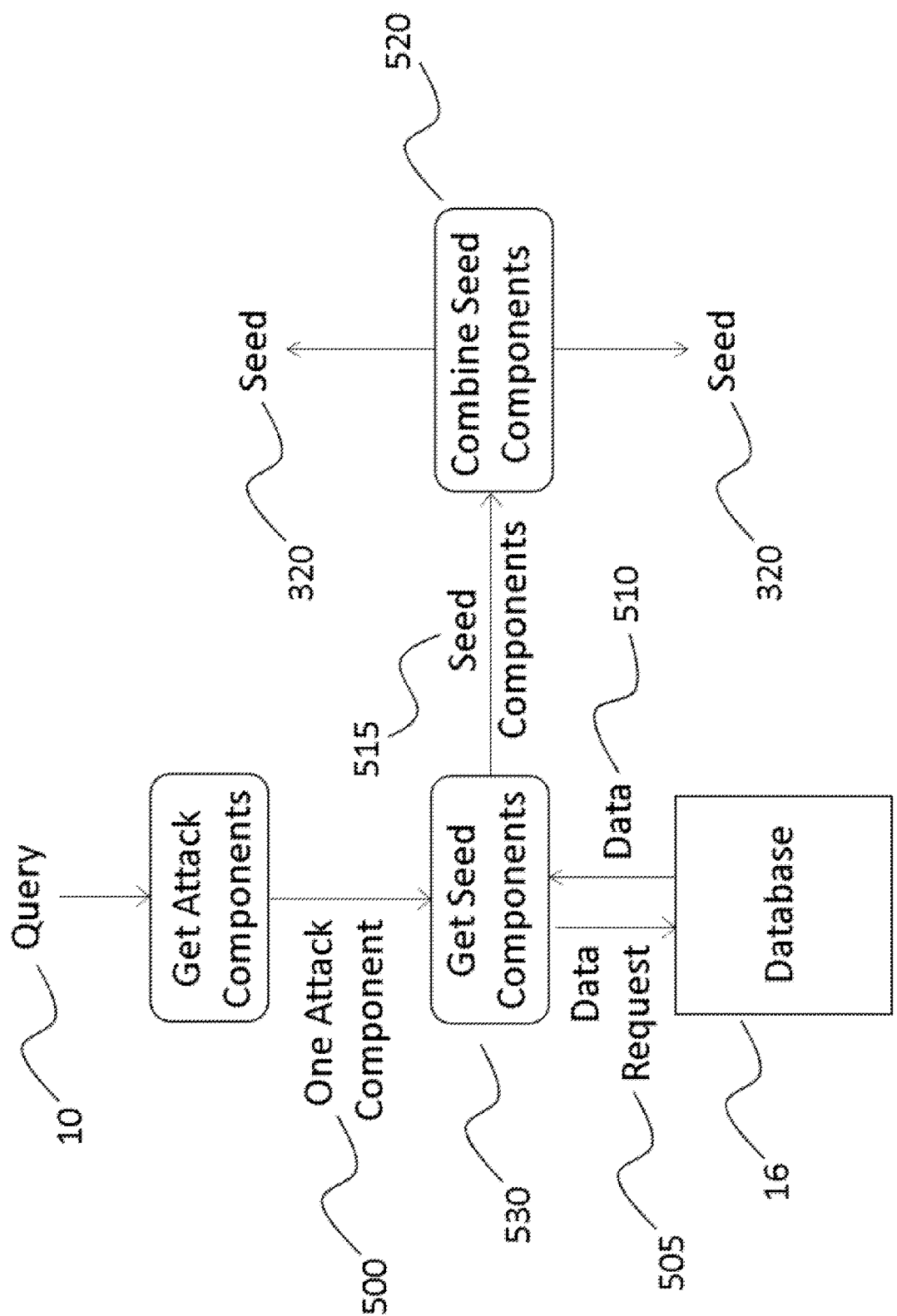
FIG. 4 shows schematically generating a seed from the attack components of a query, in accordance with an embodiment of the present invention.

FIG. 3 illustrates the elements leading from a query 10 to noise 560, and shows the relationships between those elements. FIG. 4 illustrates the steps involved in going from a query 10 to seeds 320. As shown in FIG. 3, a query 10 may have multiple attack components 500. An example of an attack component is [salary=100000]. An attack component typically has several aspects 550, such as "salary", "100000", and "=". One or more aspects 550 are used to generate a seed component 515, for instance by hashing the noise element. The process of obtaining seed components 515 from an attack component 500 is illustrated as step 530 in FIG. 4. This step may involve requesting and interpreting data from the database 16.

Seed components 515 are generally combined to produce a seed 320, although there are cases where more than one seed can be generated from a given attack component, as illustrated in step 520 of FIG. 4. Each seed is used to generate a noise element 555 (i.e. a pseudo-random Gaussian value), and noise elements are combined to generate the noise 560.

In an embodiment, each seed component is a hash of an aspect of the attack component, the seed components are combined with an XOR operation and the resulting value is combined with a secret random number with an XOR operation to produce the seed. As will be understood, there are many other ways to generate a seed from one or more aspects of the attack component.

In an embodiment, one or more aspects of the seed are the names of one or more columns in the attack component. In an embodiment, each distinct column name individually contributes to a noise element (i.e. two distinct column names in an attack component would produce two noise elements). In another embodiment, the column names are combined to produce a single noise element. In an embodiment, each column name is hashed to produce the seed component.

In an embodiment, the cloak derives an aspect of the seed by observing how the database itself treats the attack component. Referring to FIG. 4, the cloak may send a request 505 to the database 16, which returns data 510 that contains the values of one or more columns that are used in the attack component. In step 530 the cloak may use these values to derive one or more seed components 515 that contribute to one or more seeds 320.

For example, suppose that the cloak receives the query [SELECT count(*) FROM table WHERE salary=100000]. The cloak requests the salary column from the database, and uses the received values (in this case, all values are 100000) to derive the seed component.

In another example, the cloak receives the query [SELECT count(*) FROM table WHERE salary !=100000] (all rows where the salary is not equal to 100000). Here again, the cloak requests the salary column from the database and uses the received values to derive the seed component.

In another example, the cloak receives the query [SELECT count(*) FROM table WHERE salary+age=100000]. The cloak may request the salary and age columns from the database. The cloak may generate seed components for two seeds, one derived from the salary column and one from the age column. Alternatively, the cloak may generate seed components for a single seed.

In an embodiment, the cloak uses all of the distinct values from the requested column to derive the seed component. In an embodiment, each distinct value is hashed, and the resulting hashed values are combined with XOR operations to produce the seed component. Other embodiments for deriving the seed component from the values reported by the database for the column used in the attack component will be apparent to one of ordinary skill in the art.

In an embodiment, a noise element is derived from the UID column. In this case, the UID column is the requested column used to derive a seed component.

In an embodiment, the cloak generates a seed component from one or more constants that appear in the attack component. For instance, in the attack component [salary=100000], 100000 is a constant. In an embodiment, each of the one or more constants are hashed and combined with an XOR function.

In an embodiment, the cloak predicts what the database would return for the column in the attack component, and uses the result of this prediction to generate the seed component rather than request the column from the database. For example, if the attack component is [salary=99999+1], the cloak may predict that the salary column would contain only the value 100000, and therefore use the value 100000 to generate the seed component.

In an embodiment, the attack element consists of a pair of inequalities that define a range of values. For instance, in the query [SELECT count(*) FROM table WHERE age>=40 AND age<50], a range of ages is requested. The cloak may regard the two inequalities that define the range as a single attack component. In an embodiment, the cloak uses both constants as seed components for a single seed.

In an embodiment, the cloak uses the comparison operation in the attack component as a seed component. Examples of comparison operations are '=' and '<'.

In an embodiment, when the same attack component appears multiple times in a query, the cloak assigns a value from a counter to each such component, and uses the counter value as a seed component. For instance, in the query [SELECT count(*) FROM table WHERE salary=100000 AND salary=99999+1], the cloak may derive a separate seed and resulting noise element from each attack component. For each semantically identical attack component, the cloak assigns a counter value, i.e. counter=0 to [salary=100000] and counter=1 to [salary=99999+1]. In an embodiment, a hash of the counter value is a seed component.

In an embodiment, the total number of noise elements is used as a seed component.

As will be appreciated, there are a variety of attack component aspects that may be used as seed components.

In an embodiment, fixed noise may be produced from a Gaussian distribution with zero mean and some standard deviation SD. A fixed threshold may be produced from a Gaussian distribution with a mean of K and some standard deviation SD. To produce fixed noise or a fixed threshold from a number of noise elements, each noise element is Gaussian with zero mean. The noise elements are summed together. The standard deviation of each noise element may be chosen so that the standard deviation of the final fixed noise is SD. In this case, the standard deviation of each noise element is less than SD. Alternatively, some minimum standard deviation SDmin may be imposed on the individual noise elements. In this case, the resulting final standard deviation may be greater than SD.

The summed noise elements has a mean of zero. Since fixed noise has a mean of zero, the final fixed noise is the sum of the noise elements. Since the fixed threshold has a mean of K, then K is added to the sum of noise elements to produce the final fixed threshold. In an embodiment, the value of K is a function of the standard deviation SD. For instance, K=4SD+1 ensures that the noisy threshold is rarely equal to or less than 1.

Now answer perturbation is described. In embodiments, the input to the statistical operation doing answer perturbation may be a table. The table may contain at least the UID column. The table may further contain other columns as well. In embodiments, for each statistical operation (count, sum, avg, etc.), there may be a variety of possible methods for answer perturbation.

Accordingly, in such embodiments, a possible method has the following three properties. First, it must be impossible or extremely unlikely for an analyst to deduce anything about individuals in the database from the operation's output. Second, the operation must be fixed as defined herein. In other words, repeated executions of queries with the same semantics produce the same noise element, and execution of a semantically different query has a significant probability of producing a different noise element. Third, any answer produced by the operation must be based on the cell values of some fixed threshold number of users. Any statistical operation with these three properties may be used in an embodiment of answer perturbation in the cloak. As will be appreciated, answer perturbation methods that have some but not all three of these properties may still provide valuable anonymization benefits.

Now exemplary embodiments of statistical operations with the above three properties are described. Statistical operations may be classified into two types. In one type, the output of the operation is a specific cell value. This is called a single-row statistical output. Examples include min, max, and median. In the absence of anonymization, each of these statistical operations would produce a single cell's exact value. In the other type, the output of the operation is a composite of the input cells. This is called a multi-row statistical output. Examples of multi-row statistical outputs include count, sum, avg, and std-dev. The output is not normally a single cell value, but rather a value derived from all of the cell values.

For single-row statistical outputs, in embodiments, the cloak ensures that the output of the answer perturbation function is a true cell value if and only if there are some number of other cells that share that value. If there are not enough other cells that share that value, then the output of the answer perturbation function is a composite of some number of other cells.

In one embodiment, the number of other cells is a fixed threshold.

Figure 5:
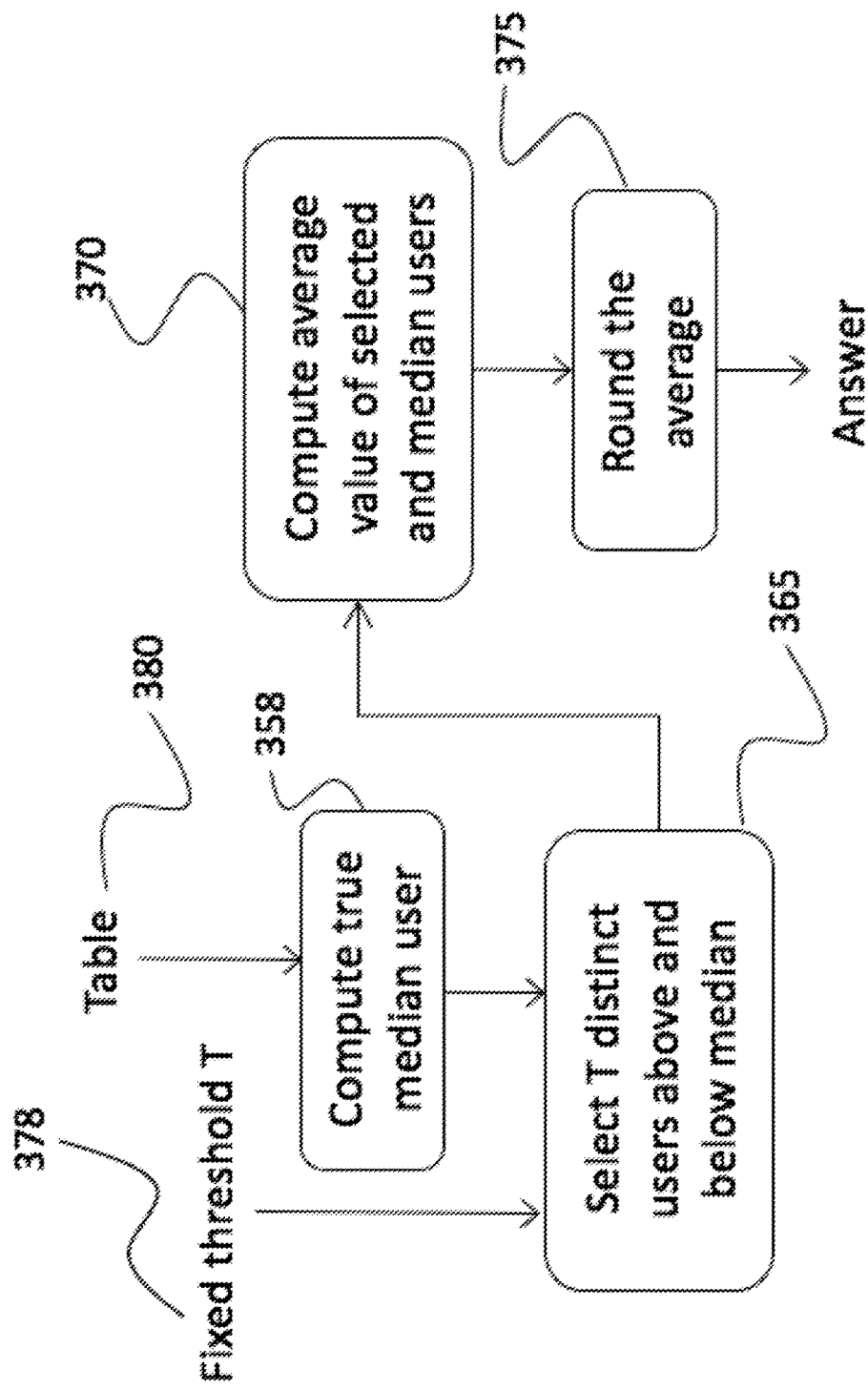
FIG. 5 shows schematically answer perturbation for the median statistical operation, in accordance with an embodiment of the present invention.

Referring to FIG. 5, in an exemplary embodiment of answer perturbation for the statistical operation median has two inputs, a fixed threshold T 378 computed as described herein, and the table 380 that contains a UID column and the column from which the median is being computed (the median column). The true median user is computed in step 358 from table 380. The T distinct users with values above and below the median user are selected in step 365. The average of the selected users and the median user are averaged in step 370. This average is rounded in step 375 to produce the answer.

This embodiment illustrates the three principles of answer perturbation. First, it is a fixed operation: the same fixed threshold produces the same answer, and a different fixed threshold could very well produce a different answer. If the selected users in step 365 all have the same value, then the answer is shared by an adequate number of users (2T+1). If the selected users in step 365 do not all have the same value, then the answer is a composite from the number of users. Either way, the answer is based on a fixed threshold number of users. Finally, it is highly unlikely that the analyst can deduce anything about an individual user. This is in part because multiple users contributed to the answer, in part because the fixed threshold makes it hard for the analyst to know for instance how many users contributed, and in part because the rounding makes it hard to determine what values may have contributed to the average.

Figure 6:
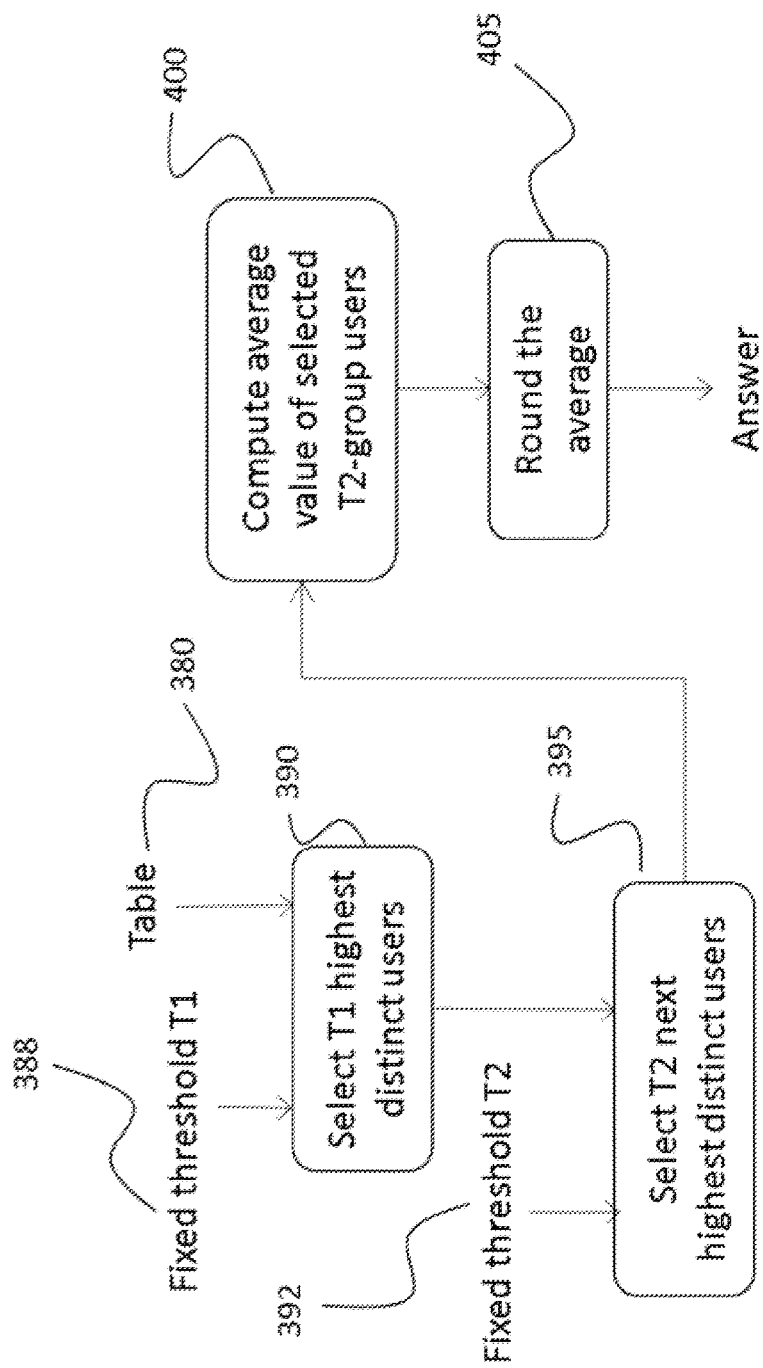
FIG. 6 shows schematically answer perturbation for the max statistical operation, in accordance with an embodiment of the present invention.

Referring to FIG. 6, an embodiment for the statistical operation max with answer perturbation is similar to that of the median operation. The primary difference is that a threshold T1 of the very highest values are ignored (steps 390 and 395). This prevents the situation where a high outlying value skews the computed average, thus revealing information about the true max user.

Figure 7:
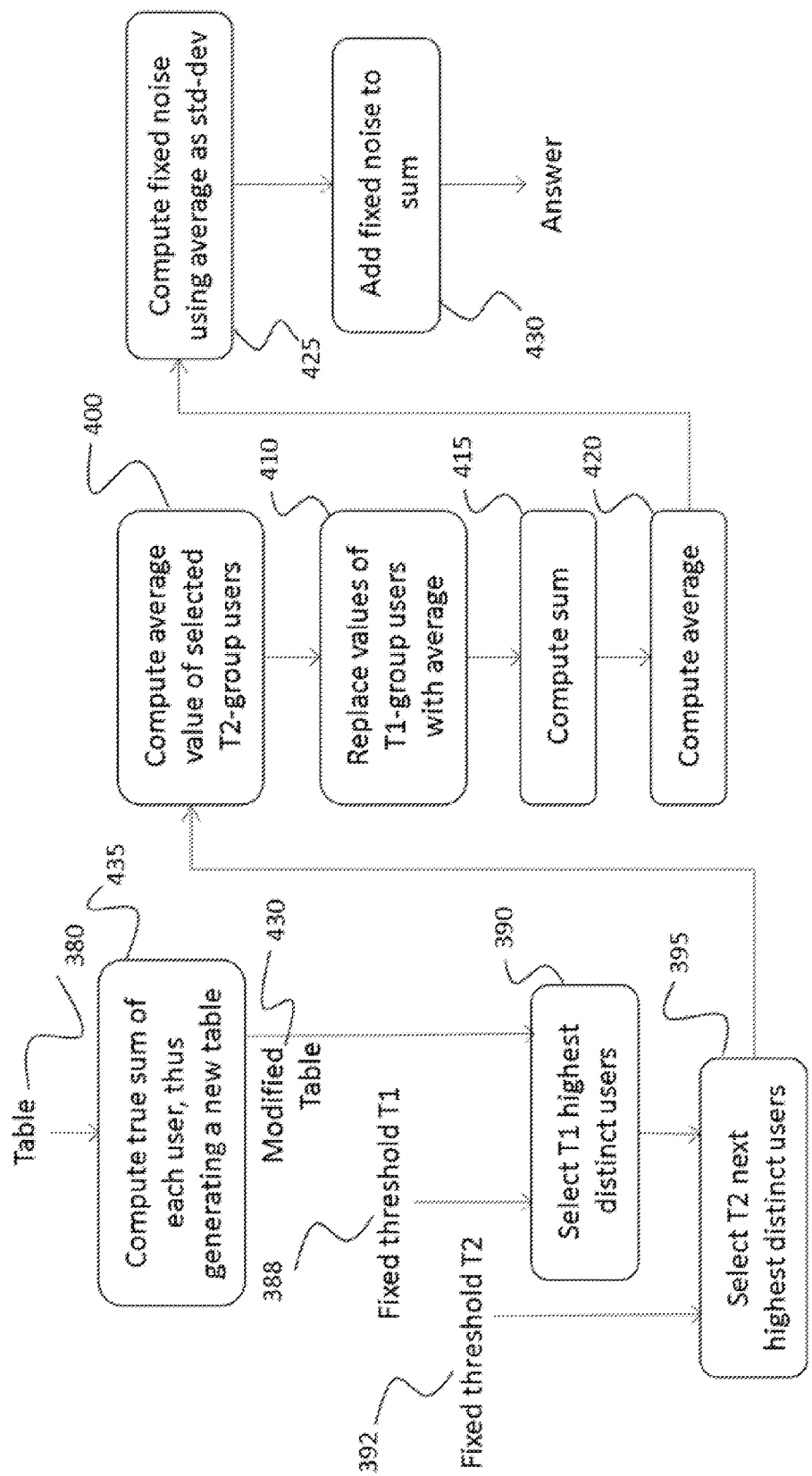
FIG. 7 shows schematically answer perturbation for the sum statistical operation, in accordance with an embodiment of the present invention.

Moving to FIG. 7, a multi-row statistical operation with answer perturbation for the sum is shown. Here, all values are assumed to be positive. In the first step 435, the sum of each individual user is computed, thus creating a modified table 430 where instead of potentially multiple rows per user, there is a single row per user containing that user's sum. Working from this modified table, two groups of users with the highest values are selected in steps 390, and 395, and the average of the second group is computed in step 400. These are analogous to the same steps done in the max operation. In step 410, the values of the first group are replaced with the average taken from the second group. This removes the effect of the highest users, while still contributing something from these users. In steps 415 and 420, the sum and average over all cells in the table are computed. Step 425 generates fixed noise using as the standard deviation for the noise the average computed in step 420. Finally, step 430 adds that noise to the sum, thus producing the answer.

In the case where there are positive and negative values, the operation of FIG. 7 may be executed twice, once for positive numbers and once for the absolute values of the negative numbers. The final answer is then the latter subtracted from the former.

In embodiments, the three principles for answer perturbation are satisfied. As will be appreciated, in embodiments, it is a fixed operation. Accordingly, in embodiments, every intermediate value may be based on a set of users, either the T1 and T2 highest users (400 and 410), or the complete set of users (415 and 420). Thus, as will be further appreciated, in embodiments, removing the effect of outliers, as well as adding noise proportional to the average contribution of any user, makes it very unlikely that anything can be deduced about individual users.

Further, in embodiments, the count statistical operation may be very similar, except instead of computing the sum of values per individual user (step 435), the number of rows per individual user is used instead.

Note that the embodiments of the median, max, min, sum, and count operations are exemplary and used here as examples to illustrate the principles of a fixed operation, of deriving an answer from a set of users, and of making it very unlikely that information about an individual user can be deduced from the answer. As will be understood, many other specific embodiments may employ the same principles, for these and other statistical operations.

Up to this point, queries have been described as though any given query produces a single answer: in other words that the query selects rows to produce a single table, and this table is subject to a statistical operation with answer perturbation. Many query languages however allow the rows to be grouped in some way, with the statistical operation applied to each such group. For instance, in SQL, this is done with the GROUP BY clause. An example of this is [SELECT age, count(*) FROM table GROUP BY age]. This query reports the count of the number of rows separately for each distinct age.

In embodiments, each such grouping may be treated like a separate table by the cloak's answer perturbation function. In other words, the table 380 from FIG. 5, FIG. 6, and FIG. 7 is understood to be that of each grouping. Grouping can cause the value of the cell itself to be reported (age, in the above example). This can cause a privacy problem, because the cell value itself might be sensitive information for a single user. To protect against this, an embodiment of the cloak suppresses the output of cell values when the number of distinct UIDs in the grouping for the cell value falls below a fixed threshold. This operation may apply to any table input to a statistical operation with answer perturbation, not just those resulting from a grouping function.

In embodiments, attack components are formed by growing or shrinking a range by an amount that includes or excludes only the victim. For instance, if an analyst knows that the victim has a salary of exactly $135,225, and is the only person in the data store with that salary, then the analyst can form a difference attack using two queries with the following WHERE clauses: [WHERE disease='AIDS' AND salary<135225], and [WHERE disease='AIDS' AND salary<135226]. Here, the query with the former WHERE clause excludes the victim, and the query with the latter is adjusted to include the victim if he or she has an AIDS diagnosis.

To defend against this, an embodiment of the cloak uses snapped alignment. The basic idea here is that ranges are limited to pre-determined (snapped) allowable alignments. Both the size of ranges and the offset of ranges are limited in this way. An example of snapped alignments would be one whereby range sizes are constrained to being one of 2n and ½n, and the offset is limited to being an even multiple of 2n and ½n respectively, where n is an integer (0, 1, 2, etc.). Examples of allowed ranges under this definition are 8-15, 2-3, and 100.5-100.75. Ranges that are disallowed under this definition are 2-5 (range of size 3 not allowed) and 9-17 (range of size 8 must be aligned on a multiple of 8). To add some flexibility while still constraining the ranges, the ability to shift the offset of any range by ½ the size of the range could be allowed. This would then allow for instance the range 4-11 (size 8, shifted by 4), but still not 9-17.

As will be appreciated, many different definitions of snapped alignments are possible. For instance, in the case of dates and times, the alignments could be along natural time unites like seconds, minutes, hours, days, months, and years. Or the alignment could be more decimal-based, allowing for instance sizes and offsets from the following set: $1 \times 10n$, $2 \times 10n$, $5 \times 10n$, where n is a positive or negative integer.

In an embodiment, the query itself must conform to snapped alignment. Any inequality must specify both the high and low ends of the range, and the range must be snapped. A query that does not conform may be dropped. Alternatively, the range may be modified by the cloak to fit to a snapped alignment. In an embodiment, the query itself specifies only the high or low end of the range, but not both. The unspecified end of the range is implicitly taken to be plus or minus infinity. Because infinity is not a valid snapped alignment, in embodiments, the cloak may determine the appropriate value of the unspecified end of the range, and set the snapped alignment accordingly. In an embodiment, the cloak establishes the unspecified end of the range as the min or max statistical operation with answer perturbation.

As will be appreciated, embodiments of the present invention may determine the difference in the number of distinct UIDs in the answers between a given query and alternate queries that could be formed by either removing individual attack components, or by shrinking a snapped-aligned range to a smaller snapped aligned range. This process is called "alternate query exploration". A given query and an alternate query are said to be "nearby queries" if the number of distinct UIDs is below a threshold. Otherwise, a given query and an alternate query are said to be "distant queries". The threshold may be a fixed threshold.

As will be appreciated that the use of noise elements for generating fixed noise and fixed thresholds as described in this patent may be combined with alternate query exploration. In an embodiment, if alternate query exploration for a given attack component determines that the resulting queries are distant queries, then the noise element associated with the attack component may be excluded from the set of noise elements. In this way, it is possible to reduce the amount of noise in an answer.

As will be appreciated, if a given query and an alternate query are found to be nearby queries, then the cloak may adjust the rows of the given query so that the output of the given query is identical to the alternate query. This operation is called "row adjustment". As will be appreciated, row adjustment defends against a difference attack by forcing the two queries of the difference attack to be identical whether or not there is a difference between the two queries.

In an embodiment, noise elements may be combined with row adjustment. In this case, the answer-perturbed statistical functions with noise elements runs over row-adjusted data.

Another type of difference attack exploits dynamic changes to the database. Suppose that at time T, the analyst makes a query. At time T1, after time T, the data for a single user is modified, for instance through addition, deletion, or change of an existing value. At time T2, after time T1, the same query is repeated. If the answer to the second query differs from that of the first query, then it is because the modified data matched the conditions of the query. As a result, the analyst learns about the modified data for a single user, thus compromising that user's privacy.

In an embodiment, each change to the database includes a value, called a timestamp, indicating the time the change was made.

In an embodiment, the cloak partitions time into periods of time called time epochs. Exemplary time epochs include an hour or a day. In an embodiment, when answering queries, the cloak ignores changes to the database with a timestamp later than the end of the last epoch. As a result, it may be rare that, in the context of any given repeated query, one and only one user's data changed between the two queries.

Figure 8:
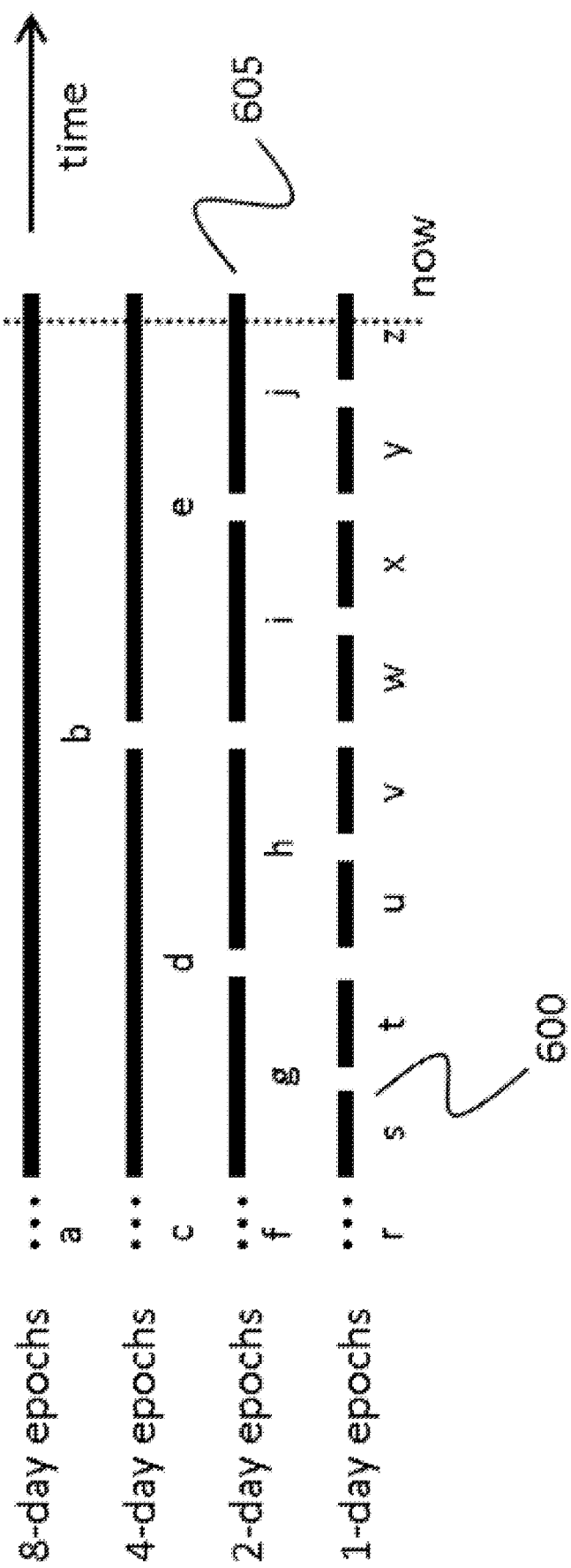
FIG. 8 shows schematically a hierarchy of time epochs, in accordance with an embodiment of the present invention.

Referring now to FIG. 8, in an embodiment, time epochs are organized hierarchically, with higher-level epochs encompassing lower-level epochs. For instance, the lowest-level time epoch 600 may be a day. The next higher-level time epoch 605 may be two days, and so on. In an embodiment, when answering queries, the cloak ignores changes to the database with a timestamp later than the end of the last lowest-level epoch.

In an embodiment, the cloak associates a noise element with each epoch, where the seed for each noise element is unique to the epoch. In an embodiment, when answering a query, the cloak composes noise from noise elements from epochs at each level of the hierarchy at the time the query was received. As shown in FIG. 8, a query received at the time referred to as "now" generates noise elements from the 1-day epoch labeled z, the 2-day epoch labeled j, the 4-day epoch labeled e, the 8-day epoch labeled b, and possibly still higher-layer epochs (not shown).

As will be appreciated, epochs may be of varying time lengths. The use of 1-day, 2-day, 4-day, etc. epochs in FIG. 8 is exemplary.

In an embodiment, the cloak computes the number of unique users whose values have changed from one epoch (the "first epoch") to the next epoch (the "second" epoch) at a given level. The cloak determines if the number of distinct changed users exceeds a threshold. In an embodiment, the threshold is a noisy threshold.

In an embodiment, when the cloak answers a query, it finds the most recent pair of adjacent epochs at the same level where the change in distinct users exceeds a threshold. In answering the query, the cloak ignores all changes that occurred after the end of the first epoch of the pair. Referring again to FIG. 8, suppose that a query is received at the time labeled "now". Further suppose that the number of distinct users that changed during 1-day epoch y exceeds a threshold. In answering the query, the cloak would ignore all changes to the database that took place after the end of 1-day epoch x.

Now suppose instead that the number of distinct changed users during 1-day epoch y does not exceed a threshold, the number of distinct changed users during 1-day epoch x does not exceed a threshold, and the number of distinct changed users during 1-day epoch w does not exceed a threshold. Further suppose, however, that the number of distinct changed users during 2-day epoch i does exceed a threshold. In answering the query, the cloak would ignore all changes to the database that took place after the end of 2-day epoch h.

As will be appreciated, the analyst could repeat the same query at each epoch to obtain up-to-date answers. Further, the cloak could, on its own accord, provide the answer to a given query at each epoch. A query whereby the cloak provides periodic answers is called a standing query.

Accordingly, in embodiments, it may be that an analyst does not wish to wait until the next epoch to receive an answer to a standing query. In such embodiments, when the cloak first receives a standing query, it provides an answer. Subsequently, every time a change occurs to the database, the cloak may determine if the change would result in a modification to the answer. If the answer is yes, then the cloak records the identity of the user to which the change applies. When the number of distinct users exceeds a threshold, the cloak provides a new answer that includes all of the changes since the last provided answer. Subsequent to providing this answer, the cloak again determines if new changes would result in a modification to the most recent answer, and provides another answer when the number of distinct changed users exceeds a threshold.

Additionally, in embodiments, the cloak may execute the foregoing method for multiple standing queries.

Finally, it is also to be understood that the cloak, and/or or other computing devices disclosed herein, may include the necessary electronics, software, memory, storage, databases, firmware, logic/state machines, microprocessors, communication links, displays or other visual or audio user interfaces, printing devices, and any other input/output interfaces to perform the functions described herein and/or to achieve the results described herein. For example, the cloak may include a controller having at least one processor and system memory/data storage structures, which may include random access memory (RAM) and read-only memory (ROM). The at least one processor may include one or more conventional microprocessors and one or more supplementary co-processors such as math co-processors or the like. The data storage structures discussed herein may include an appropriate combination of magnetic, optical and/or semiconductor memory, and may include, for example, RAM, ROM, flash drive, an optical disc such as a compact disc and/or a hard disk or drive.

Additionally, a software application that provides for adapting the at least one processor to perform the methods disclosed herein may be read into a main memory of the at least one processor from a computer-readable medium. The term "computer-readable medium", as used herein, refers to any medium that provides or participates in providing instructions to the at least one processor (or any other processor of a device described herein) for execution. Such a medium may take many forms, including but not limited to, non-volatile media and volatile media. Non-volatile media include, for example, optical, magnetic, or opto-magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, a RAM, a PROM, an EPROM or EEPROM (electronically erasable programmable read-only memory), a FLASH-EEPROM, any other memory chip or cartridge, or any other medium from which a computer can read.

While in embodiments, the execution of sequences of instructions in the software application causes at least one processor to perform the methods/processes described herein, hard-wired circuitry may be used in place of, or in combination with, software instructions for implementation of the methods/processes of the present invention. Therefore, embodiments of the present invention are not limited to any specific combination of hardware and/or software.

For example, in an embodiment, an anonymizing method for a database system is provided. The method includes the steps of receiving a query, identifying one or more attack components in the query, computing one or more noise elements from the one or more attack components, and computing fixed noise or fixed thresholds from the one or more noise elements. In certain embodiments, the method further includes the steps of inspecting the query to ensure that the query is constrained in such a way that all of the one or more attack components may be identified, and rejecting the query if the query is not so constrained. In certain embodiments, the method further includes the step of rejecting the query if at least one of the one or more attack components is a range that does not conform to a snapped alignment. In certain embodiments, the method further includes the step of modifying at least one of the one or more attack components in the query to be a range that conforms to a snapped alignment. In certain embodiments, a column name from at least one of the one or more attack components is used in part to compute at least one of the one or more noise elements. In certain embodiments, a constant from at least one of the one or more attack components is used in part to compute at least one of the one or more noise elements. In certain embodiments, the method further includes the steps of requesting one or more values from a database associated with a column name in at least one of the one or more attack components, and using the one or more values from the database in part to compute at least one of the one or more noise elements. In certain embodiments, the requested values are from a UID column. In certain embodiments, the method further includes the step of requesting rows and columns from a data store. In certain embodiments, the method further includes the step of computing an answer-perturbed statistical operation over the requested rows and columns using at least one of the fixed noise and the fixed thresholds. In certain embodiments, the perturbed answer is influenced by one or more rows of the requested rows with at least a fixed threshold number of distinct UIDs. In certain embodiments, the answer is perturbed with fixed noise. In certain embodiments, an amount of the fixed noise is enough to obscure the effect of individual user data. In certain embodiments, the method further includes the step of suppressing the answer if the number of distinct UIDs falls below said fixed threshold. In certain embodiments, the method further includes the steps of executing an alternate query exploration procedure, and excluding the noise elements associated with the given attack component if the alternate query is a distant query. In certain embodiments, the method further includes the step of ignoring changes to the database after an end of a last epoch of one or more epochs. In certain embodiments, the one or more epochs form an epoch hierarchy and the method further includes the step of computing additional noise elements from epochs at each layer of the epoch hierarchy. In certain embodiments, the method further includes the steps of identifying a most recent epoch whereby a distinct number of changed users exceeds a threshold, and ignoring changes to the database after the end of an epoch prior to said most recent epoch.

Other embodiments provide for an anonymizing method for a database system. The method includes the steps of: providing an answer to a standing query; upon receipt of a database change, determining if the change affects the answer of the standing query; recording a set of distinct users associated with a change in the answer of the standing query; and providing a new answer to the standing query when a number of users in the recorded set of distinct users exceeds a threshold.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. An anonymizing method for a database system, comprising the steps of: receiving a query; identifying one or more attack components in the query by inspecting an instruction set defining the query, the attack components comprising a query conditional expression including operators and logic to determine if any given row in a database would be included or excluded from an answer to the query; computing one or more noise elements from the one or more attack components, wherein each of the one or more noise elements comprises a noise value determined by the operators and logic of the query conditional expression of a corresponding attack component, wherein attack components with identical operators and logic result in the same noise value; computing a fixed noise value from the one or more noise elements; and generating an answer to the query that is perturbed by the fixed noise.

2. The method according to claim 1, further comprising the steps of:
inspecting the query to ensure that the query is constrained in such a way that all of the one or more attack components may be identified; and
rejecting the query if the query is not so constrained.

3. The method according to claim 1, further comprising the step of:
rejecting the query if at least one of the one or more attack components is a range that does not conform to a snapped alignment.

4. The method according to claim 1, further comprising the step of:
modifying at least one of the one or more attack components in the query to be a range that conforms to a snapped alignment.

5. The method according to claim 1, wherein:
a column name from at least one of the one or more attack components is used in part to compute at least one of the one or more noise elements.

6. The method according to claim 1, wherein:
a constant from at least one of the one or more attack components is used in part to compute at least one of the one or more noise elements.

7. The method according to claim 1, further comprising the steps of:
requesting one or more values from the database associated with a column name in at least one of the one or more attack components; and
using the one or more values from the database in part to compute at least one of the one or more noise elements.

8. The method according to claim 7, wherein:
the requested values are from a UID column.

9. The method according to claim 1, wherein generating the answer comprises the step of:
requesting rows and columns from the database.

10. The method according to claim 9, further comprising the steps of: computing a statistical operation over the requested rows and columns to generate the answer; perturbing the answer with said fixed noise, and outputting the perturbed answer.

11. The method according to claim 10, wherein:
an amount of the fixed noise is enough to obscure the effect of individual user data.

12. The method according to claim 9, further comprising the steps of:
computing a number of distinct UIDs from the UIDs of said requested rows;
computing fixed thresholds from the noise values of the one or more noise elements; and
suppressing the answer if the number of distinct UIDs falls below said fixed thresholds.

13. The method according to claim 1, further comprising the steps of:
executing an alternate query exploration procedure; and
excluding the noise elements associated with the given attack component if the alternate query is a distant query.

14. The method according to claim 1, further comprising the step of:
ignoring changes to the database after an end of a last epoch of one or more epochs.

15. The method according to claim 14, wherein the one or more epochs form an epoch hierarchy and the method further comprises the step of:
computing additional noise elements from epochs at each layer of the epoch hierarchy.

16. The method according to claim 1, further comprising the steps of:
identifying a most recent epoch whereby a distinct number of changed users exceeds a threshold; and
ignoring changes to the database after the end of an epoch prior to said most recent epoch.

* * * * *